US006449733B1

(12) United States Patent
Bartlett et al.

(10) Patent No.: US 6,449,733 B1
(45) Date of Patent: Sep. 10, 2002

(54) ON-LINE REPLACEMENT OF PROCESS PAIRS IN A CLUSTERED PROCESSOR ARCHITECTURE

(75) Inventors: Wendy B. Bartlett, Los Altos; Jan O. Granberg, Santa Cruz, both of CA (US); Colleen A. Lingley, Munich (DE); Roger C. Parkison, Felton; Gary S. Smith, Campbell, both of CA (US); Neil A. Trickey, Nottingham (GB)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/206,504

(22) Filed: Dec. 7, 1998

(51) Int. Cl.[7] .................................................. H02H 3/05
(52) U.S. Cl. ................................ 714/13; 714/2; 714/4; 714/8
(58) Field of Search .............................. 714/13, 4, 2, 8

(56) References Cited

U.S. PATENT DOCUMENTS

| 4,141,066 A | * | 2/1979 | Keiles ........................ 714/13 |
| 4,807,228 A | * | 2/1989 | Dahbura ..................... 714/13 |
| 4,817,091 A | | 3/1989 | Katzman et al. ............... 371/9 |
| 5,621,885 A | * | 4/1997 | Del Vigna, Jr. .......... 395/182.11 |
| 5,751,932 A | * | 5/1998 | Horst et al. .............. 395/182.1 |
| 5,948,108 A | * | 9/1999 | Lu et al. ........................ 714/4 |
| 6,170,044 B1 | * | 1/2001 | McLaughlin et al. ....... 711/162 |
| 6,286,110 B1 | * | 9/2001 | Klein et al. .................... 714/2 |

* cited by examiner

Primary Examiner—Peter Wong
Assistant Examiner—Tim Vo
(74) Attorney, Agent, or Firm—Leah Sherry; Oppenheimer, Wolff & Donnelly LLP

(57) ABSTRACT

In a multiple processing system or cluster, a pair of processes, assuming the role of a primary process and a backup process to the primary process, are replaced on-line by stopping the backup process; creating the replacement backup process; checking to ensure compatibility between the primary and replacement backup processes so that communication between them is possible and information sent by the primary process to the replacement will be correctly received and handled; providing the replacement backup process with that state of the primary process needed in order to take over the function and operation of the primary process; switching roles so that the replacement backup process now takes over the function and operation of the primary, and the primary becomes the backup; and repeating the steps of creating, checking, providing and switching, to conclude with a newly-installed replacement primary process and a replacement backup process, completing the on-line replacement of the process pair.

13 Claims, 1 Drawing Sheet

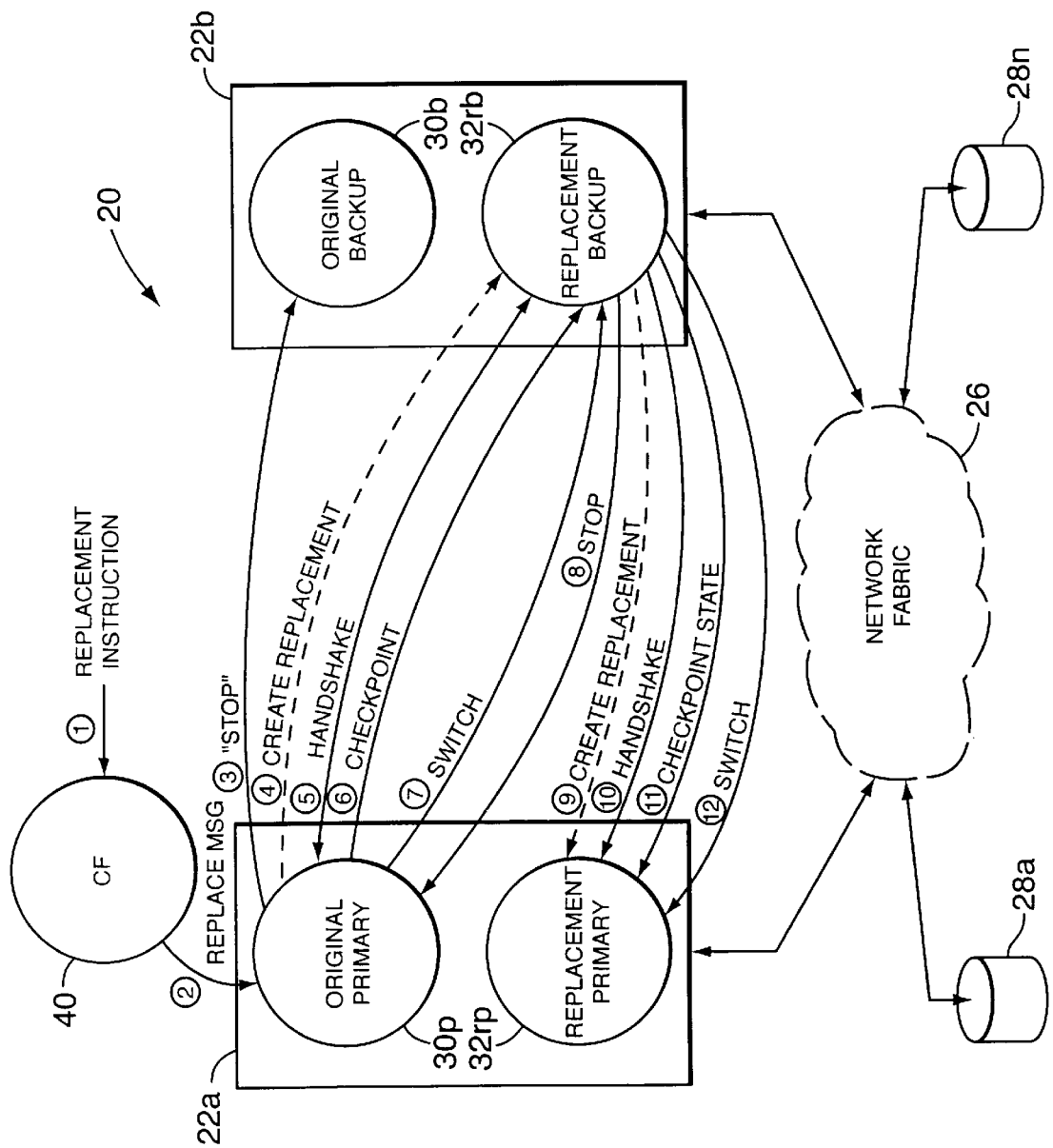

ON-LINE REPLACEMENT OF PROCESS PAIRS IN A CLUSTERED PROCESSOR ARCHITECTURE

BACKGROUND OF THE INVENTION

The present invention relates generally to fault-tolerant data processing architectures that use pairs of processes to continue operation in the face of failure of a process or a processor on which a process is running. More particularly the invention relates to replacement of process pairs with different version without having to stop operation of the system or the process pair.

Today's computing industry includes the concept of continued availability, promising a processing environment can be ready for use 24 hours a day, 7 days a week, 365 days a year. This promise is based upon a variety of fault tolerant architectures and techniques, among them being the clustered multiprocessor architectures and paradigms described in U.S. Pat. Nos. 4,817,091 and 5,751,932 to detect and continue in the face of errors or failures, or to quickly halt operation before the error can spread.

The quest for enhanced fault tolerant environments has resulted in the development of the "process pair" technique—described in both of the above identified patents. Briefly, according to this technique, application software ("process") may run on the multiple processor system ("cluster") under the operating system as "process-pairs" that include a primary process and a backup process. The primary process runs on one of the processors of the cluster while the backup process runs on a different processor, and together they introduce a level of fault-tolerance into the execution of an application program. Instead of running as a single process, the program runs as two processes, one in each of the two different processors of the cluster. If one of the processes or processors fails for any reason, the second process continues execution with little or no noticeable interruption of service. The backup process may be active or passive. If active, it will actively participate in receiving and processing periodic updates to its backup state in response to checkpoint messages from the corresponding primary process of the pair. If passive, the backup process may do nothing more than receive the updates, and see that they are stored in locations that match the locations used by the primary process. The content of a checkpoint message can take the form of complete state update, or one that communicates only the changes from the previous checkpoint message. Whatever method is used to keep the backup up-to-date with its primary, the result should be the same so that in the event the backup is called upon to take over operation in place of the primary, it can do so from the last checkpoint before the primary failed or was lost.

Unfortunately, there are times when the application program, and therefore its process pair instantiations must be updated, modified, and/or changed. When this occurs it has been the practice to stop the system or stop the application, thereby diminishing the availability of the system. Thus, in order to provide continued availability in the face of changes and upgrades to the application software, there is needed a method of being able to perform updates on-line; that is, without stopping the system or the application program being updated (assuming the application program is running as a process pair).

SUMMARY OF THE INVENTION

The present invention takers advantage of the fault-tolerant capability of process pairs, i.e., the continued capacity to provide service as long as at least member of the pair exists. Thus, even if one member of the pair fails or is lost, the other remains in service and available for use in the on-line replacement approach of the present invention. The invention provides a simple and inexpensive method, therefore, of replacement of software that uses the process pair model.

Broadly the invention involves purposely stopping one of the processes, restarting the stopped process with a different version of the application program, and then repeating the action for the other process. In this manner, the code being executed is updated without ever stopping the process pair, since at least one of the two processes is always available.

According to a preferred embodiment of the invention the method proceeds generally as follows. First, the primary process of the process pair to be replaced is notified to begin the replacement and told where the replacement application is located. The primary process responds to this request by first sending its backup process a request that the backup process stop operation. When the backup process has stopped, a new backup process (the "replacement backup process") is created from the replacement application. Since the primary process and the replacement backup process are derived from different application programs, the code they are executing are different. Accordingly, the primary and replacement backup processes perform a handshake routine to check that the two code versions are sufficiently compatible to continue with and complete the replacement. If the check ensures sufficient compatibility, the replacement backup process is then updated by the primary process with all the state necessary for it to take over the function and operation of the primary. The roles of the replacement backup and the primary processes are switched so that the replacement backup process becomes the primary process, and the former primary now becomes the backup process. During this phase of the replacement the primary process, and now the replacement backup process, have functioned normally to respond to requests and perform whatever operations were expected as if the replacement were never started.

The steps described above are repeated, this time with the replacement backup process performing the functions of the replacement described as the primary, and the original primary process functioning as the backup, concluding with replacement of the primary process with a replacement primary process, yielding a process pair that corresponds to the replacement application.

Since these steps may be readily executed by the processes themselves, and are difficult or impossible to execute from an external process on behalf of the process pair, a utility (command facility) assumes the responsibility for relaying a user command to start an on-line replacement to the target process pair. The command facility operates to respond to a user command to initiate the replacement by simply sending a message to the primary process of the pair to be replaced, requesting the replacement, and awaiting its completion. The actual replacement, however, is left to the involved process pair. Consequently, in addition to steps 1 through 5, the process pair must recognize the request from the command facility, and respond to the command facility concerning the success of the replacement In an alternate embodiment of the invention, the steps of switching the roles of the primary and replacement backup processes and repeating the sequence to then replace the primary process are not used. Rather, the (old) primary process commits suicide after the replacement backup process is in place and updated. Loss of a one of the process pair will cause the replacement backup process to assume the role of the primary process. It will, according to conventional protocol, create a backup for itself, using the replacement application. This method of replacement is faster and less complex. Since only one request need be sent to the process pair to initiate replacement, the process pair would not go through two switches unless specifically designed to do so. On the other hand, the advantage to keeping steps of switching roles and repeating the replacement process is two fold: First, the two step method allows a break in the replacement where a user can try out the new version and then choose to back out of the replacement if any problems exist; second, a switch allows the primary to stabilize before starting the second half of the replacement in which it will stop its backup and therefore lose its safety net, while having the primary commit suicide leaves the new primary without a safety net immediately.

BRIEF DESCRIPTION OF THE DRAWINGS

The Figure diagrammatically illustrates the colloquy that takes place between the halves of a process pair to implement the present invention.

DESCRIPTION OF THE PREFERRED EMBODIMENT

Overview:

Turning now to the Figure, there is diagrammatically shown the operational sequence of the present invention. The invention is preferably employed in a cluster 20 comprising plural processor units 22, two of which are shown in FIG. 1 and identified as processors 22a, 22b. The actual number of processors is not affected by the present invention, except that for fault tolerant operation there should be at least two processors 22—one for each process of a process pair.

The processors 22 are communicatively interconnected by a network fabric 26 which may take the form of the interprocessor bus structure shown in U.S. Pat. No. 4,817,091, the system area network (SAN) shown in U.S. Pat. No. 5,751,932, or any other structure that provides communication between the processors 22. The network fabric 26 will also communicatively connect the processors 22 to various peripheral devices such as secondary storage represented here as (disk) storage elements 28 (28a, ... , 28n).

Each of a pair of the processors 22 will, as the Figure illustrates, have installed one of the processes of a process pair 30. Thus, the Figure shows the process pair 30 including a primary process $30_p$ running on processor 22a, and the backup process $30_b$ resident on processor 22b. The Figure also shows additional processes residing on the processors 22: replacement primary and backup processes $32_{rp}$ and $32_{rb}$, respectively. At the point in time, however, prior to replacement, the replacement process pair 32 does not exist. Its member processes will be created and installed on the processors 22 according to the present invention as described below.

It is important to note that one of the processes in a process pair is designated the primary, and the other the backup. Depending on how the process pair is implemented, the backup may be passive in nature, doing little more than receiving "checkpoints," i.e., messages containing information about the current state of the primary, from the primary. Alternatively, the backup process may be a more active participant in checkpointing operation by mimicking some or all of the actions of the primary when the current state information is received. Thus, reference to active or passive checkpointing principally refers to the methods for maintaining state in the backup process. Typically, a passive backup process does little more than receive checkpoint information; an active backup process pair can fall anywhere in the spectrum.

Before the replacement begins, the primary process $30_p$ is operating normally on the processor 22a, performing according to its particular function. Periodically, the primary process will "checkpoint" state to its backup process $30_p$, running on the processor 22b. The checkpointed state is information associated with the on-going operation of the primary process $30_p$ that is transferred to the backup process $30_b$. The information transferred by each checkpoint operation provides the backup process $30_b$ with sufficient state so that should the primary process $30_p$ fail, or the processor 22a on which the primary process $30_p$ runs fails, the backup process $30_b$ can begin running to take over as the failed primary at or close to the same point at which the failure occurred.

Process pairs are typically memory-resident instances of (created from) application programs resident elsewhere (e.g., storage 28). Thus, the primary and backup processes $30_p$, $30_b$ are memory resident instances of an application program that may be resident on secondary storage—such as storage 28. On-line replacement of an application program capable of producing process pairs requires that the replacement application program be located so that it can be accessed by the process pair being replaced—such as on storage 28. Thus, assume that the replacement application program is stored on the storage 28a. The major steps taken to replace the process pair 30 with an upgraded process pair from the upgraded application program now on storage 28a are described in detail further below. It should be remembered that the replacement operation will be taking place while the participant process pair continues in operation, i.e., taking and responding to requests in normal fashion, conducting periodic checkpoints to the backup, etc. The steps may be briefly outlined as:

1. A replacement instruction is passed to a command facility (CF) 40, identifying the process pair to be replaced and the location of the replacement application from which the replacement process pair will be created and installed.

2. The CF 40 will perform some initial checks (primarily to make sure no mistakes were made in the entry by the user), and after verifying that the replacement is credible, will notify the primary process $30_p$ to initiate the replacement, passing to it the information needed to perform the replacement such as the location of the replacement application program.

3. In response to the request, the primary process $30_p$ will send a "stop yourself" message to the backup process $30_b$.

4. When the backup process $30_b$ stops, the primary process $30_p$ will then create a replacement backup process $30_{rb}$ from the replacement application program on storage 28a.

5. The primary process $30_p$ will initiate a "handshake" routine with the newly-created replacement backup process $30_{rb}$ to ensure that the two can communicate adequately with one another to continue with the replacement, and that any data structures created with the creation of the replacement backup process $32_{rb}$ are capable of properly receiving checkpoint information that will be sent by the primary process $30_p$ to bring it up-to-date with the state of the primary process $30_p$.

6. The primary process $30_p$ will then initiate a "corpulent checkpoint" to transfer to the replacement backup process all the state information necessary to allow the replacement backup process $32_{rb}$ to take over the operation of the primary process $30_p$.

7. Then, the primary and replacement backup processes $30_p$, $32_{rb}$ will switch roles so that the primary process $30_p$ will (momentarily) become a backup for the (now primary) replacement backup process $32_{rb}$.

Then, steps 3–7, above, are repeated as steps 8–12 (FIG. 1) with the replacement backup process $32_{rb}$ functioning as the primary, and the (to be replaced) primary process $30_p$ functioning as the backup. The conclusion is, as illustrated in FIG. 1, the on-line replacement of the process pair 30 with the replacement pair 32.

A more detailed description of the steps taken to perform the online replacement of a process pair follows.

Replacement Initiation:

Before the replacement operation can begin, the replacement application program must be located so that it is accessible to the process pair being be replaced. Thus, for example, the replacement program may be initially stored on the storage 28a. Then, the user will input a replacement request command to the CF 40, supplying such information as the identification and location of the process pair (30) to be replaced, the identification and location of the replacement application software so that it can be located and accessed, and such other information that may be needed to (e.g., version identification), at this initial stage, verify the correctness of the request being entered. The CF 40 will also make such checks as seeing if the identified process pair exists, or if the backup process of the process pair has terminated for whatever reason.

In response to the request command, the CF 40 will message the process pair (i.e., the primary process $30_p$), requesting that they initiate and carry out the requested replacement. The primary process $30_p$ will then initially 1. Take the identification (location) of the replacement application program from the message;

2. Store the information about the message so that it can reply to the message as the replacement is finished;

3. Determine if it is in a suitable state to start the replacement. If the process pair is already doing another switch, the primary process $30_p$ replies to the CF 40 with the error message that it is already switching, and does not continue with the replacement process. (For example, it may be that a replacement was started earlier, but never completed. In this case, it is safer to abort the pending replacement before issuing another one. Also, the process pair may be in the act of starting up.) If the process pair does not have a backup, because it has died after the CF 40 checked for its existence, the primary process $30_p$ replies to the CF 40 with the appropriate error message, and discontinues the replacement process. If the process pair to be replaced is too busy, the primary process $30_p$ will again reply to the CF 40 with an error message, and discontinue the replacement process.

4. Determine if the replacement application program is suitable by checking (1) to see if the replacement application is a process object file, (2) verifying that the replacement contains a version procedure (vproc) identifying the object file as belonging to the expected product, and (3) confirming that the version procedure shows a version that is late enough to recognize a handshake protocol. (A vproc is a procedure that is embedded in an object file when constructed. Version procedures are used to identify products and product revisions in object files. An object file may contain several version procedures.) In general, this part of the method ensures that various process data structures are compatible between the application to be replaced and the replacement application. If the primary process determines that the replacement application program is unsuitable for any reason, it will reply to the CF 40 with a different error message, and again does not continue with the replacement process. The CF 40 will check the type and vproc of the replacement application program before sending the request to the process pair.

5. Set a state variable in the primary process $30_p$ (and checkpointed to the backup process $30_b$) to indicate that an on-line replacement is in progress.

The determination of whether the process pair is in a valid state, as outlined in step 3 above, is a check that operates to enhance the success of the replacement. This check allows the process pair to refuse to do the replacement if the process pair is currently in a state when a replacement would cause disturbances that could be avoided if the replacement were carried out at a more appropriate time.

Stopping the Backup:

In order to avoid situations where both members of a process pair believe they have reason to kill their partner process, and end up killing each other, it is preferable to only allow a process to kill itself. If one of the process pair members believes that its partner process should die, it sends a message to that partner process requesting that the partner process, in effect, commit suicide. Consequently, if either of the processes 30 wishes to stop the other during the replacement, it will send a message to the other requesting that it commit suicide.

Preferably, each member of a process pair will be structured to take advantage of the present invention by containing code which can send a "stop yourself" message to the associated member of the pair, as well as code that can recognize and carry out such a request. If sending the "stop yourself" message presents a problem, the primary process will reply to the CF 40 with an error message, reset any variables related to the attempted replacement, and will not continue with the replacement.

Since the primary process $30_p$ is not directly killing its backup process $30_b$, it must wait for news (typically, from the operating system—see below) that the backup process has stopped before continuing with the replacement. After sending the "stop yourself" message to the backup process $30_b$, the primary process $30_p$ returns to its normal operation.

As with the code to send and handle the "stop yourself" message, the members of process pair should also contain code to recognize a system message indicating that the backup has terminated. (Preferably, the system is conventionally structured to enable the detection of the termination of a process, and among other things notify those processes who may have registered with the system to be notified of such terminations.) This code should be structured to recognize the special case: the primary requested the death of the backup so that it could do a replacement. This should be possible by looking at the state variable set during step 5 of the Initiating Replacement section, above.

Starting a New Backup:

Once the primary process $30_p$ sees that its backup process $30_b$ no longer exists, it will create the replacement backup process $32_{rb}$ using the application program file name (i.e., location) that was included in the message from the CF 40 that initiated the replacement procedure. In the past, each member of a process pair contained a procedure to start a new backup in the event a member died. This procedure is modified to accept a new parameter, the location of the replacement application program, and to include this parameter when starting the backup.

If the new backup fails to start for any reason, the primary should reply to the CF 40 with an error message, reset any variables related to the on-line replacement, and terminate the replacement procedure. Special care should be taken to catch cases where the replacement backup process $32_{rb}$ starts in the face of a warning or error message received in response to the start backup request. In these cases, the primary process $30_p$ should stop the replacement backup process $32_{rb}$ with a "stop yourself" message to the replacement backup process $32_{rb}$, and then respond to the CF 40 as if the replacement backup process $32_{rb}$ had failed to start.

The Handshake:

Once the replacement backup process $32_{rb}$ starts, the primary process $30_p$ initiates a handshake routine with the replacement backup process to ensure compatibility between the two sufficient to continue with the replacement. If the handshake fails for any reason, the primary process $30_p$ will send an error message to the CF 40, send a "stop yourself" message to the replacement backup process $32_{rb}$, reset any variables related to on-line replacement, and discontinue the replacement. The primary process $30_p$ will finish cleanup by restarting a new backup process $30_b$ that is running the original code.

Once the replacement backup process $32_{rb}$ is created and running, the members of the process pair (now consisting of the yet to be replaced primary process $30_p$ and the replacement backup process $32_{rb}$) will be executing two different versions of code. This period of time starts when the replacement backup process $32_{rb}$ is started during the first part of the replacement, and ends when the primary process $30_p$ is stopped. The two versions of process code must be checked to ensure that they are compatible, i.e., that they are able to communicate and work together in completing the replacement. This checking is conducted by a handshake sequence that preferably includes:

1. Determining if the primary process $30_p$ and replacement backup process $32_{rb}$ are compatible, and if necessary, which version the newer version should emulate (i.e., versioning of data structures and constants). The compatibility checking includes a vproc/version check performed by the CF 40, and a version check performed during the handshake. Unless these checks pass, interface structures cannot be trusted, and the replacement must be aborted. The checkpoint interface can be versioned, which would allow for some translation or emulation, but more importantly, it would allow for the detection of incompatibility, which would be cause for aborting the replacement. Also, the check ensures that process data structures are compatible. In some cases, versioning and translation could be performed, but typically when this check fails, the replacement is aborted. (There are two choices when dealing with version mapping. One is to process the different versions with different routines/procedures (emulation). The other is to map the older data structure to the newer data structure (translation). If the backup understands a lower version of the checkpoint message interface than the primary does [which may be the case if it becomes necessary to revert from a newer version of the application to an older version], then the primary will create its checkpoint messages in the older format. Conversely, if the backup has newer, expanded versions of data structures whose contents are sent to it in checkpoint messages, it may include code to translate the old-format structures it receives into the new-format structures that it keeps internally.) In addition, message interfaces should be consistent between the old and new software. They should both support the same dialects and dialect versions, unless specifically programmed to allow for new dialect versions, or to drop old dialect versions. Too, external product interfaces should be versioned and checked prior to proceeding with the replacement. This would include the check by the primary process for undefined procedure calls during process create.

2. Determining if the checkpoint interface between the two is compatible (i.e., identifying the lowest version present in the primary or backup and then using that version for the checkpointing), and if necessary, which version of the interface the replacement backup process $32_{rb}$ should emulate.

3. A check must be implemented to ensure that the primary and replacement backup processes $30_p$ and $32_{rb}$, respectively, support exactly the same versions of every interface other than their checkpoint interface (e.g., external interfaces). If they are not the same, the primary and backup must not be allowed to communicate, and the replacement procedure must be terminated.

4. The version of the code and each of the process interfaces must be defined; that is, the code and all interfaces need to be versioned. This is necessary for a successful handshake implementation.

5. Any pointers included in checkpoint messages should be removed, unless it is determined that the pointer values will remain valid regardless of a replacement. This is necessary because both data and function pointers (code and data addresses) often are subject to change as a new version of code (the replacement) is brought in. While Code addresses can not be trusted it is possible that some relative data addresses will remain trusted. This will have to be determined on a case by case basis. It is very unlikely that a function pointer pertaining to v1.1 of the object is valid in v1.2. Likewise, using the active checkpointing model, it is possible that the relative address of a certain entity varies from v1.1 to v1.2 of an object. Thus a pointer to that entity, if checkpointed from v1.1 to v1.2 would be invalid.

With these basic requirements for process pairs using two different versions of object code in mind, implementation of these requirements can now be discussed. The implementation can be divided into three categories: (1) information that a process must maintain in order to make the interaction possible, (2) handshakes between the primary and the backup, and (3) the coding of new functionality to be executed only when both primary and backup are ready.

Process Information:

This category includes that information that the process must maintain in order to make interaction possible. It can be divided into two sub-categories: (a) information the process must "know", and (b) information the process must "learn." The process is provided with the information it must "know" by the developer of the application program from which the process derives its existence. This is information that should be hardcoded into the application program using constants so that it is easy to change any time the information changes. The process determines the information it should "learn" at run-time, when the process executes the handshake of this invention, and then stores the information in variables.

The first set of known information maintained by every process is the list of code versions the process can emulate, including its current code version. The current code version should be updated every time the code is even slightly modified, and any outdated versions must be removed as soon as they are no longer supported. It is necessary to maintain a list of possible versions, instead of simply a maximum and minimum version, since a subsequent release process could allow a situation in which a certain feature is in versions 1, 2, and 4, but not in version 3.

Each process should also maintain a list of the dialect (i.e., the message language used by process pairs to communicate with one another) versions it supports for each interprocess dialect, including its checkpoint dialect. Any time a process supports a new dialect version or new dialect, or stops supporting an old dialect version or old dialect, the developer should update this list.

The dialect information for all dialects, other than the checkpoint dialect, could be considered redundant. Since the code version is updated every time the developer makes a small change, a dialect change causing two versions to be incompatible could be caught by the handshake simply by removing the older code version from the list of valid versions. However, since the effect of these changes could be disastrous if the replacement were attempted, a secondary check has been deemed worthwhile.

Based on what the process "knows," and information received in the handshake messages, each process is able to determine two extra pieces of information: the code version to emulate, and the checkpoint interface version to use. These pieces of information will change depending on the versions of the primary and the backup, and should therefore not be hardcoded, but set as a result of the handshakes.

The Handshake—Revisited:

Although multiple handshakes may be used, it may be beneficial to combine them into a single handshake which checks both code and process interface versions.

The handshake between the primary and replacement backup processes $30_p$, $32_{rb}$ must occur any time a process starts a replacement backup to determine if the new backup is code and interface compatible with the primary process $30_p$. However, the handshake must be done before the primary process $30_p$ sends the first checkpoint to the backup, and must be done regardless of whether or not the new replacement backup process $32_{rb}$ starts due to an on-line software replacement. These requirements exist since, until the handshake occurs, neither the replacement backup process $32_{rb}$ nor the primary process $30_p$ know which code or interface version to use, and therefore can not communicate with its partner.

Since the handshake must be possible regardless of the code versions of the primary process $30_p$ or replacement backup process $32_{rb}$, the handshake must be the same regardless of the code or interface version. Consequently, once developed, the handshake may never change, or the primary process $30_p$ must use trial and error to determine which handshake should be sent.

The handshake sent from the primary process $30_p$ to the replacement backup process $32_{rb}$ should include the list of all compatible code versions including the current code version, and a list of all supported versions of each of the dialects.

The replacement backup process $32_{rb}$, upon receipt of the handshake, should determine if it is compatible with the primary process $30_p$, select the most recent common code version to execute, select the most recent common checkpoint dialect to use, and then reply to the primary process $30_p$ with the chosen code and checkpoint dialect versions or a message stating that the replacement backup process $32_{rb}$ is not compatible with the primary process $30_p$. In order to avoid possible deadlock situations, the replacement backup process $32_{rb}$ should not initiate a message with the primary process $30_p$; rather, it should simply reply to the message from primary process $30_p$. If the primary process $30_p$ and replacement backup process $32_{rb}$ are not compatible, the replacement backup process $32_{rb}$ should respond to the primary process $30_p$ and then stop, enabling the primary process $30_p$ to start a new replacement backup process $32_b$ in its own compatible image. In the case of an on-line replacement, an error message indicating that the handshake failed must be returned to the CF 40 and displayed for the user.

When the replacement backup process $32_{rb}$ processes a handshake, it begins by comparing the list of code versions the process can emulate, with the list of code versions contained in the handshake. The replacement backup process $32_{rb}$ either declares the lists incompatible because there is no intersection, or identifies the highest common version (newest code version both processes can emulate) and remembers the version as the code version to emulate.

The second check compares the list of checkpoint interface versions the process can handle, with the list of checkpoint interface versions contained in the handshake. The replacement backup process $32_{rb}$ either declares the lists incompatible because there is no intersection, or identifies the highest common version (newest checkpoint interface version both processes can handle) and remembers the version as the checkpoint interface version to emulate.

The third check compares the list of all current interface versions (excluding the checkpoint interface version) contained in the handshake with the process' list of current interface versions. If any of these versions do not match, the replacement backup process $32_{rb}$ declares the two processes incompatible. As mentioned earlier, this check should be redundant, since if any of the process interfaces (other than the checkpoint interface) change, the two sets of code versions should not overlap. However, the extra check provides extra security in case someone forgets to update the version information.

If all three checks pass, the replacement backup process $32_{rb}$ considers the handshake successful. The primary process $30_p$ and replacement backup process $32_{rb}$ communicate using the highest checkpoint interface version they both understand, and execute only the functionality contained in their highest common code version.

Before leaving the discussion of handshake implementation, it is necessary to mention that the handshake requires special consideration when dealing with passive-backup process pairs. When the primary process $30_p$ creates the replacement backup process $32_{rb}$ it must recognize that a different object file (the replacement application software) was used and enter the handshake sequence before any checkpoints are made. The pair can then begin replacement running as an active backup long enough to go through the handshake sequence so the backup can reply intelligently (rather than just accepting data in the passive mode), then switch to passive-mode checkpointing. If the handshake fails for any reason the replacement backup process $32_{rb}$ must be terminated. The replacement backup process $32_{rb}$ must also recognize that it has been created by a primary process running a different object file and enter the handshake sequence before handling any received checkpoint information. Again, if the handshake fails for any reason the replacement backup process $32_{rb}$ must terminate.

The Corpulent Checkpoint:

Once the handshake establishes compatibility between the primary and replacement backup processes $30_p$ and $32_{rb}$, the primary process $30_p$ will now prepare to switch roles with the replacement backup process $32_{rb}$; that is, the switch in roles will result in the replacement backup process $32_{rb}$ taking over the function and operations of the primary process $30_p$, and the primary process $30_p$ serving, at least momentarily, as a backup to the (now primary) replacement backup process $32_{rb}$. In preparation for the switch, the primary process $30_p$ will send a "corpulent checkpoint." The corpulent checkpoint is structured to provide the replacement backup process with enough state information to allow it to take over the role of primary without causing any noticeable disturbance to any users of the process pair.

If a problem occurs sending the Corpulent Checkpoint, the primary process $30_p$ will notify the CF 40 with an error message, send a "stop yourself" message to the replacement backup process $32_{rb}$, reset any variables related to the on-line replacement, and terminate the replacement, and then start the old code as the backup.

The Switch:

The Corpulent Checkpoint to the replacement backup process $32_{rb}$ is followed by a request from the primary process $30_p$ to the replacement backup process to switch roles. Those member processes of a process pair capable of being replaced on-line according to the teachings of the present invention will contain code to request and carry out a switch. Preferably, the replacement backup process $32_{rb}$, upon receipt of the request to switch, will invoke an operating system procedure or routine to appropriately modify the kernel data that identifies the pair, and which of the pair is the primary and which is the process backup. The replacement backup process $32_{rb}$ then declares itself primary.

If an error occurs when sending the request to switch roles, the primary process $30_p$ will notify the CF 40 with an appropriate error message, send a "stop yourself" message to the replacement backup process $32_{rb}$, reset any variables related to the on-line replacement, and discontinue the replacement, and start the old code as the backup.

If, however, the request to switch message to the replacement backup process $32_{rb}$ is completed successfully, the replacement backup process $32_{rb}$ will, using the information provided it by the Corpulent Checkpoint message, begin operating as the primary of the process pair, responding to requests just like the primary process $30_p$ (now the backup of the pair) would have. The Primary process $30_p$ is set to realize that it is the backup of the pair.

Completing the Replacement:

At this point the backup process $30_b$ has been replaced and correspondingly the process pair now consists of the replacement backup process $32_{rb}$ which is now operating as the primary of the pair, and the original primary process $30_p$ now operating as the backup of the pair. Now the process is repeated, this time with the replacement backup process $32_{rb}$ performing those steps that were performed by the original primary process $30_p$. Accordingly, the original primary process $30_p$ will be requested to stop with a "stop yourself" message, the replacement primary process $32_{rp}$ will be created from the replacement application program, a handshake will be conducted between the replacement primary and backup processes $32_{rp}$, $32_{rb}$, and if completed successfully, a Corpulent Checkpoint operation will be performed by the replacement process $32_{rb}$ to transfer all the operational state necessary to the replacement primary process $32_{rp}$.

For load-balancing purposes, the on-line replacement of the process pair 30, according to the present invention, may include a second switch operation so that the replacement primary process $32_{rp}$ begins operating as the primary of the (replacement) process pair 32, and the replacement backup process $32_{rb}$ performs backup operations. The replacement process pair 32 then continues to function as is expected.

What is claimed is:

1. In a multiple processor system that includes a plurality of processor units interconnected for communicating therebetween, there being a primary process operating with an operating state on a one of the plurality of processor units and a backup process associated with another of the plurality of processor units, a method of replacing the primary and backup processes that includes the steps of:

requesting that the backup process terminate operation;

creating a replacement backup process on the another processor unit;

establishing communication between the primary process and the replacement backup process to confirm compatibility between them;

providing the replacement backup process with the operating state of the primary process;

reversing roles of the primary process and the replacement backup process making them the new backup and new primary processes, respectively;

terminating operation of the new backup process;

creating a replacement new backup process on the another processor unit;

providing the replacement new backup process with operating state of the of the new primary process; and reversing operating roles of the new backup primary process and the new primary process so that they become the replacement primary process and the replacement backup process, respectively.

2. The method of claim 1, wherein the first requesting step includes the primary process making the request that the backup process terminate operation.

3. The method of claim 1 wherein the replacement primary process's code is different from the primary process's code.

4. The method of claim 2, wherein the first creating step includes the primary process creating the replacement backup process.

5. The method of claim 3 wherein the replacement primary process emulates routines or procedures of the primary process.

6. The method of claim 3 wherein the replacement primary process maps data structures used by the primary process to data structures used by the replacement process.

7. In a multiple processor system that includes a plurality of processor units interconnected for communicating therebetween, there being a primary process operating with an operating state on a one of the plurality of processor units and a backup process associated with another of the plurality of processor units, a method of replacing the primary and backup processes that includes the steps of:

creating a replacement backup process on the another processor unit;

establishing communication between the primary process and the replacement backup process to confirm compatibility between them;

providing the replacement backup process with the operating state of the primary process;

terminating the primary process to leave the replacement backup process as the replacement primary process;

creating another replacement backup process on the one CPU.

8. In a multiprocessor system that includes a plurality of interconnected processor units, there being a primary process associated with one of the processor units and a backup process associated with one of the processor units, a method of replacing the primary and backup processes that includes the steps of:

creating a first replacement process on one of the processor units;

conducting a handshake between the primary process and the first replacement process to ensure compatibility between the first replacement process's code and the primary process's code;

providing the first replacement process with an operating state of the primary process;

terminating the primary process and to leave the first replacement primary process;

operating the first replacement process as the replacement primary process;

creating a replacement backup process from the replacement primary process.

9. The method of claim 8 wherein the first replacement process's code is different from the primary process's code.

10. The method of claim 8 further comprising the steps of:

terminating the backup process; and operating the first replacement process as a backup process until the first replacement process commences operation as the replacement primary process.

11. The method of claim 9 wherein the replacement primary process emulates routines or procedures of the primary process.

12. The method of claim 9 wherein the replacement primary process maps data structures used by the primary process to data structures used by the replacement process.

13. The method of claim 10 wherein the step of operating the first replacement process as the replacement primary process occurs automatically as a result of the termination of the primary process.

* * * * *

UNITED STATES PATENT AND TRADEMARK OFFICE
CERTIFICATE OF CORRECTION

PATENT NO.     : 6,449,733 B1                                      Page 1 of 1
DATED          : September 10, 2002
INVENTOR(S)    : Wendy B. Bartlett et al.

It is certified that error appears in the above-identified patent and that said Letters Patent is hereby corrected as shown below:

Column 1,
Line 11, "different version without having to stop operation of the" should read
-- a different version without having to stop operation of the --;
Line 66, "The present invention takers advantage of the fault-" should read
-- The present invention takes advantage of the fault --.

Column 11,
Line 53, "an operating state on a one of the plurality of processor units" should read
-- an operating state on one of the plurality of processor units --;
Line 57, "terminate operation;" should read -- terminate its operation; --
Line 58, "creating a replacement backup process on the another" should read -- creating a replacement backup process on the other --.

Column 12,
Line 12, "backup process terminate operation." should read -- backup process terminate its operation. --;
Line 27, "an operating state on a one of the plurality of processor units" should read
-- an operating state on one of the plurality of processor units" --.

Signed and Sealed this

Twenty-second Day of July, 2003

JAMES E. ROGAN
*Director of the United States Patent and Trademark Office*